United States Patent
Hwang et al.

(10) Patent No.: US 10,875,191 B2
(45) Date of Patent: Dec. 29, 2020

(54) SHAPE COMPLIANT ELECTROADHESIVE GRIPPER

(71) Applicants: DAWOO FA Co., LTD, Chungcheongnam-do (KR); DAEGU GYEONGBUK INSTITUTE OF SCIENCE AND TECHNOLOGY, Daegu (KR); Korea University Of Technology And Education Industry—University Cooperation Foundation, Chungcheongnam-do (KR)

(72) Inventors: Hae Sook Hwang, Daejeon (KR); Hyung Chul Kim, Seoul (KR); Dong Won Yun, Daejeon (KR); Sang Youn Kim, Seoul (KR); Kyoung Bok Jin, Gyeonggi-do (KR)

(73) Assignees: DAWOOFA CO., LTD, Cheonan-si (KR); Korea University Of Technology And Education Industry-University Cooperation Foundation, Cheonan-si (KR); DAEGU Gyeongbuk Institute Of Science And Technology, Daegu (KR)

(*) Notice: Subject to any disclaimer, the term of this patent is extended or adjusted under 35 U.S.C. 154(b) by 243 days.

(21) Appl. No.: 16/023,019

(22) Filed: Jun. 29, 2018

(65) Prior Publication Data
US 2019/0134826 A1    May 9, 2019

Related U.S. Application Data

(63) Continuation of application No. PCT/KR2018/002271, filed on Feb. 23, 2018.

(30) Foreign Application Priority Data

Nov. 8, 2017  (KR) .................. 10-2017-0148280
Feb. 22, 2018  (KR) .................. 10-2018-0021117

(51) Int. Cl.
*B25J 15/00*    (2006.01)
*B65G 47/92*    (2006.01)
(Continued)

(52) U.S. Cl.
CPC ....... *B25J 15/0085* (2013.01); *B25J 15/0009* (2013.01); *B25J 15/0061* (2013.01);
(Continued)

(58) Field of Classification Search
CPC ... H02N 13/00; B25J 15/0009; B25J 15/0061; B25J 15/0085; B25J 15/12; B65G 47/92
(Continued)

(56) References Cited

U.S. PATENT DOCUMENTS

| | | | |
|---|---|---|---|
| 2014/0035306 A1* | 2/2014 | Garcia ................ | B25J 15/0009 294/213 |
| 2014/0104744 A1* | 4/2014 | Prahlad ................ | H02N 13/00 361/234 |
| 2015/0298320 A1* | 10/2015 | Eisele ................ | B25J 15/0071 294/24 |

FOREIGN PATENT DOCUMENTS

JP    2014237219 A    12/2014

OTHER PUBLICATIONS

Kevin Tai, et al., "State of the Art Robotic Grippers and Applications," Robotics Journal, Jun. 17, 2016, vol. 5, Article No. 2: 11, School of Engineering, University of Guelph, Guelph, ON N1G 1Y4, Canada.

* cited by examiner

*Primary Examiner* — Kevin J Comber
(74) *Attorney, Agent, or Firm* — Dinsmore & Shohl LLP; Yongsok Choi Esq.

(57) ABSTRACT

A present disclosure relates to a shape compliant electroadhesive gripper for picking up atypical objects having various shapes, sizes, and materials, and a shape compliant elec-
(Continued)

troadhesive gripper according to one embodiment of the present disclosure includes a body, a shape compliant module disposed on the body, rigidity of the shape compliant modules being variably controllable, and an electroadhesive module disposed on the shape compliant module.

4 Claims, 13 Drawing Sheets

(51) Int. Cl.
     *H02N 13/00*      (2006.01)
     *B25J 15/12*      (2006.01)
(52) U.S. Cl.
     CPC .............. *B25J 15/12* (2013.01); *B65G 47/92* (2013.01); *H02N 13/00* (2013.01)
(58) Field of Classification Search
     USPC ........................................................ 361/234
     See application file for complete search history.

(b)

SHAPE COMPLIANT ELECTROADHESIVE GRIPPER

CROSS-REFERENCE TO RELATED APPLICATIONS

This application is a continuation of PCT/KR2018/002271 filed on Feb. 23, 2018 which claims priority to Korean Patent Application No. 10-2017-0148280 filed on Nov. 8, 2017 and Korean Patent Application No. 10-2018-0021117 filed on Feb. 22, 2018, the entire contents of which are herein incorporated by reference.

FIELD OF THE INVENTION

The present disclosure relates to a shape compliant electroadhesive gripper, and more particularly to, a shape compliant electroadhesive gripper for picking an atypical object of various shapes, sizes, and materials.

BACKGROUND

Robots are widely used to perform various tasks such as welding, assembling, painting, and the like in industrial manufacturing sites. Further, robot utilization fields are gradually expanding across all industries and service fields including a personal service field providing services in the surroundings of human life, and a professional service field providing specialized services such as medical care and the like.

Particularly, in recent years, with the rapid growth in a logistics market, it has become very important to increase a processing speed through automation of logistics, and in order to meet such a need, development of a picking robot for picking up cargo and a transfer robot for transferring cargo is actively underway.

In the picking robot among such robots, a gripper is necessarily required to pick up atypical objects, i.e., objects of various shapes, sizes, and materials, in order to implement automation of logistics.

The gripper includes a mechanical gripper capable of mechanically picking up an object by having a plurality of fingers driven by a hydraulic pressure or a pneumatic pressure, and a vacuum gripper capable of picking up an object by generating a vacuum on an interface between the vacuum gripper and the object. Further, known is an electroadhesive gripper for picking up an object using an electrostatic force generated when a current flows through a conductor.

However, the mechanical gripper and the vacuum gripper have limitations in picking up objects of various sizes and shapes without damage with an appropriate pressure, and thus the mechanical gripper and the vacuum gripper are not effective for picking up atypical objects, and in order to pick up a heavy object, a conventional electroadhesive gripper should have a large contact area and a large voltage should be applied to the conventional electroadhesive gripper, so that the conventional electroadhesive gripper has a limitation in picking up the atypical objects.

Therefore, it is still required to develop a gripper capable of picking up atypical objects.

SUMMARY OF THE INVENTION

The present disclosure is directed to providing a shape compliant electroadhesive gripper capable of picking up an atypical object with a simplified structure and an easy mechanism while overcoming a limitation of the conventional gripper.

Further, the present disclosure is directed to providing a shape compliant electroadhesive gripper capable of efficiently picking up various atypical objects through a combination of an electroadhesive force and a mechanical gripping force.

One aspect of the present disclosure provides a shape compliant electroadhesive gripper for picking up an atypical object, the gripper including a body, a shape compliant module disposed on the body and having rigidity which is variably controllable, and an electroadhesive module disposed on the shape compliant module.

According to one embodiment, the shape compliant module may include a magnetorheological elastomer, and when a magnetic field is not applied, a shape of the shape compliant module may be changed according to a shape of an external object which is brought into contact with the shape compliant module, and when the magnetic field is applied, rigidity of the magnetorheological elastomer may be increased to maintain the shape of the shape compliant module. Alternatively, the shape compliant module may include an electrorheological elastomer, and when an electric field is not applied, a shape of the shape compliant module may be changed according to a shape of an external object which is brought into contact with the shape compliant module, and when the electric field is applied, rigidity of the electrorheological elastomer may be increased to maintain the shape of the shape compliant module.

According to one embodiment, the electroadhesive module may be include an insulator and a conductor disposed on the insulator and may be able to be brought into contact with an external object by an electrostatic force generated when a voltage is applied to the conductor. The conductor may include a first conductor and a second conductor, the first conductor and the second conductor may be disposed and spaced apart from each other on the insulator, and the shape compliant electroadhesive gripper may be able to be brought into contact with the external object by an electrostatic force generated when different first and second voltages are respectively applied to the first conductor and the second conductor.

According to one embodiment, the body may be connected to a gripper driver and is rotatable in two directions.

Another aspect of the present disclosure provides a shape compliant electroadhesive gripper for picking up an atypical object, the gripper including a plurality of fingers, a shape compliant module disposed on each of the plurality of fingers and having rigidity which is variably controllable, and an electroadhesive module disposed on each of the shape compliant modules.

According to another embodiment, each of the plurality of fingers may include a joint capable of being bent in a direction in which the shape compliant module and the electroadhesive module are disposed. Further, the plurality of fingers may be connected to and installed at a common shaft, and the plurality of fingers may be connected to finger drivers and are rotatable about the common shaft.

According to one embodiment of the present disclosure, an atypical object can be picked-up with a simplified structure including a shape compliant module and an electroadhesive module.

Further, it can effectively respond to objects of various shapes, sizes, and materials by means of a combination of an electroadhesive force through the electroadhesive module and a mechanical gripping force through the shape compliant module and a finger.

DETAILED DESCRIPTION OF THE PREFERRED EMBODIMENTS

Figure 1:
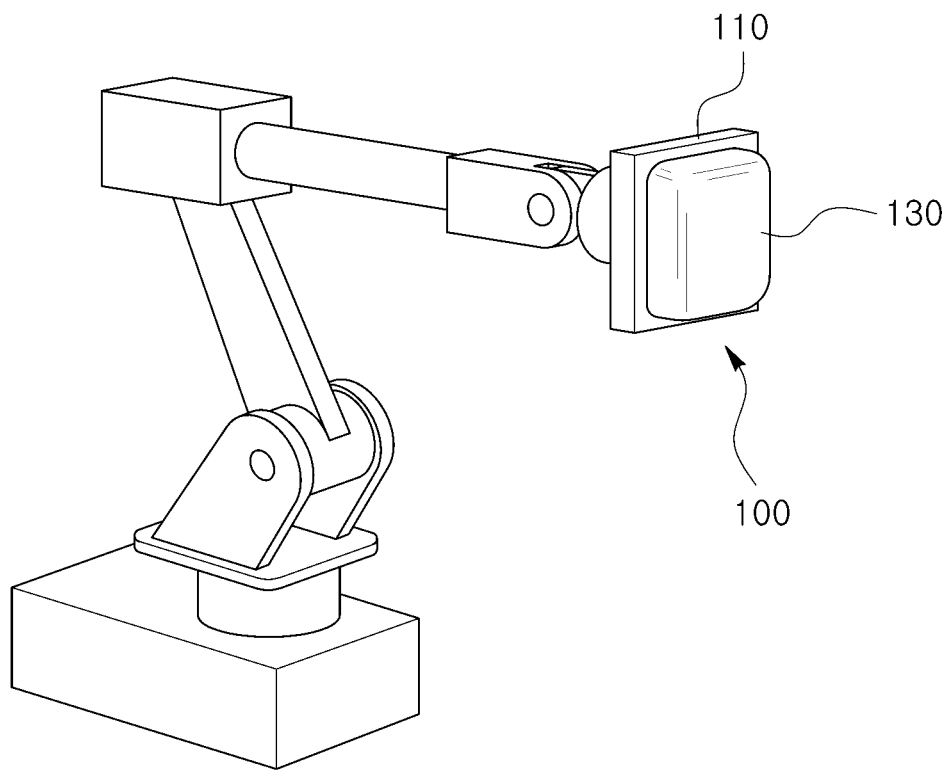
FIG. 1 is a diagram illustrating a robot having a shape compliant electroadhesive gripper according to one embodiment of the present disclosure.

Hereinafter, preferred embodiments of the present disclosure will be fully described in a detail which is suitable for implementation by those skilled in the art to which the present disclosure pertains with reference to the accompanying drawings.

In order to clearly describe the present disclosure, a description of a portion not related to the present disclosure will be omitted, and throughout this disclosure, like reference numerals will be assigned to like elements.

When one element is herein referred to as being "above" other element, this includes a case in which the one element is located "immediately above" the other element as well as a case in which another element is present between the one element and the other element, and a connection of two elements means that the two elements are connected by being in direct contact with each other as well as these elements are connected through another element.

Further, a size, a thickness, a position, and the like of each element shown in the drawings are arbitrarily illustrated for convenience of description, and thus the present disclosure is not necessarily limited to those shown in the drawings. That is, it should be noted that specific shapes, structures, and features described herein can be changed and implemented from one embodiment to another embodiment without departing from the spirit and scope of the present disclosure, and a position or an arrangement of each element can also be changed without departing from the spirit and scope of the present disclosure.

Accordingly, the following detailed description is not to be taken in a limiting sense, and the scope of the present disclosure should be construed to include the scope of the appended claims and equivalents thereof.

Figure 2:
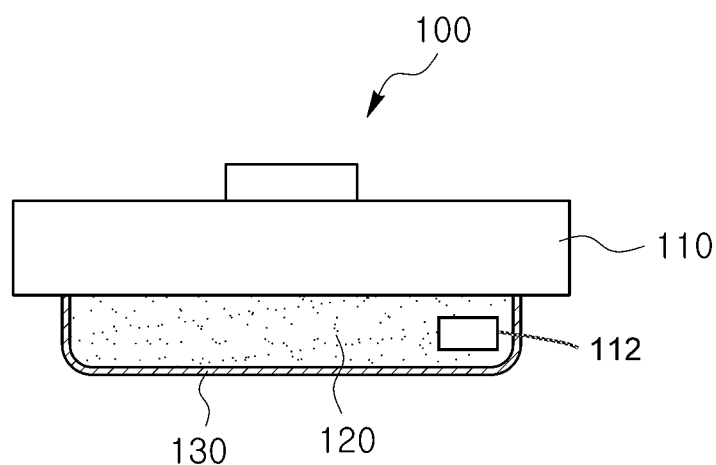
FIG. 2 is a cross-sectional view of the shape compliant electroadhesive gripper according to one embodiment of the present disclosure.

FIG. 1 is a diagram illustrating a robot having a shape compliant electroadhesive gripper according to one embodiment of the present disclosure, and FIG. 2 is a cross-sectional view of the shape compliant electroadhesive gripper according to one embodiment of the present disclosure.

Referring to FIGS. 1 and 2, a shape compliant electroadhesive gripper 100 according to one embodiment of the present disclosure is an end effector of a robot 10 and includes a body 110, a shape compliant module 120, and an electroadhesive module 130.

First, the body 110 of the shape compliant electroadhesive gripper 100 according to one embodiment of the present disclosure may be connected to an arm of the robot 10 and may translationally and rotationally move to locate the shape compliant electroadhesive gripper 100 at a position for picking up an object.

Figure 3:
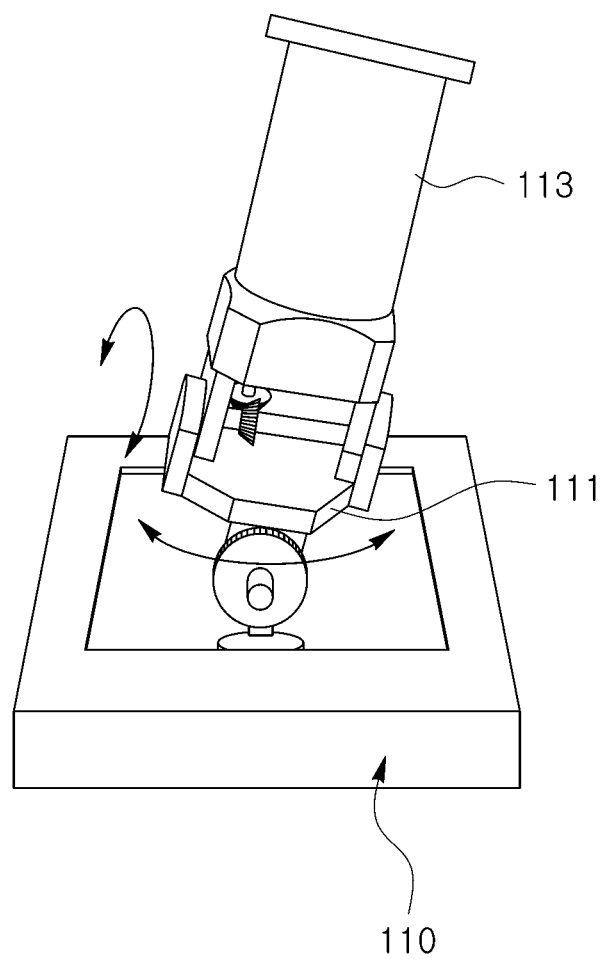
FIG. 3 is a schematic diagram of a body of the shape compliant electroadhesive gripper according to one embodiment of the present disclosure.

FIG. 3 is a schematic diagram of the body of the shape compliant electroadhesive gripper according to one embodiment of the present disclosure, and referring to FIG. 3, the body 110 may be connected to the arm of the robot 10 through two connectors, i.e., a first connector 111 and a second connector 113. Specifically, the body 110 may be connected to the first connector 111 to be pivotable in a left-right direction based on FIG. 3, the first connector 111 may be connected to the second connector 113 to be pivotable in a forward-backward direction based on FIG. 3, and the second connector 113 may be fixedly connected to the arm of the robot 10. Such pivoting actions may be performed through a driving of a motor (not shown) based on each axes connecting the body 110 to the first connector 111 and the first connector 111 to the second connector 113.

As described above, the body 110 according to the present embodiment may be connected to the arm of the robot 10 to be pivotable in the two directions. Although a configuration in which the body is pivotable in the two directions using the two connectors and two motors has been described in the present embodiment, the present disclosure is not limited thereto, and it is also possible to take a form, e.g., other known form in which the body may be pivotable in the two directions using a differential gear.

Referring back to FIG. 2, in the shape compliant electroadhesive gripper 100 according to the embodiment of the present disclosure, the shape compliant module 120 capable of variably controlling rigidity is disposed on the body 110. In the present embodiment, the shape compliant module 120 includes an elastic body having variable rigidity and a controller capable of controlling the rigidity of the elastic body, and the shape compliant module 120 may be controlled such that, when the shape compliant electroadhesive gripper 100 is in contact with an object, rigidity of the shape compliant module 120 is lowered and thus the elastic body is deformed according to a shape of the object, and after the elastic body is deformed according to the shape of the object, the rigidity is increased and thus the deformed shaped is maintained.

For example, the shape compliant module 120 may include a magnetorheological elastomer and a magnetic field controller 112. In this case, it is possible to use properties of the magnetorheological elastomer in which magnetic particles are included in a polymer and thus, when a magnetic field is applied to the polymer, rigidity increases while the magnetic particles have directivity. Specifically, in a state in which a magnetic field is not applied, the shape compliant module 120 is brought into contact with an object and is deformed according to a shape of the object, and then when the shape compliant module 120 has been deformed, a magnetic field is applied through the magnetic field controller 112 to increase rigidity so that the deformed shape of the shape compliant module 120 may be maintained.

Similar to the above, the shape compliant module 120 may include an electrorheological elastomer and an electric field controller. In this case, it is possible to use properties of the electrorheological elastomer in which polarized particles are included in a polymer material such as natural rubber, silicone, or the like and thus, when an electric field is applied to the polymer material, rigidity increases while the polarized particles have directivity. That is, in a state in which an electric field is not applied, the shape compliant module 120 is brought into contact with an object and is deformed according to a shape of the object, and then when the shape compliant module 120 has been deformed, an electric field is applied through the electric field controller to increase rigidity so that the deformed shape of the shape compliant module 120 may be maintained.

As described above, the shape compliant module 120 may be in contact with objects of various sizes and shapes and may be deformed according to the shapes of the objects to secure a wide contact area between the shape compliant module 120 and with the object, thereby increasing an electroadhesive force of the electroadhesive module, which will be described below, as well as serving to wrap around the object when the object is gripped and transferred.

In the shape compliant electroadhesive gripper 100 according to one embodiment of the present disclosure, the electroadhesive module 130 is disposed on the shape compliant module 120. The electroadhesive module 130 may include an insulator and a conductor installed on the insulator, and when a voltage is applied to the conductor, the electroadhesive module 130 may adhere to an external object to the shape compliant electroadhesive gripper 100 using an electrostatic force generated by inducing an opposite polarity to the external object.

Figure 4:
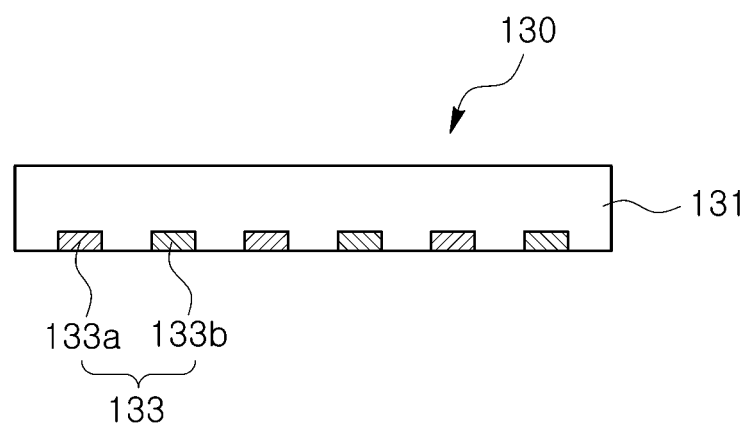
FIG. 4 is a cross-sectional view of an electroadhesive module of the shape compliant electroadhesive gripper according to one embodiment of the present disclosure.
Figure 5A:
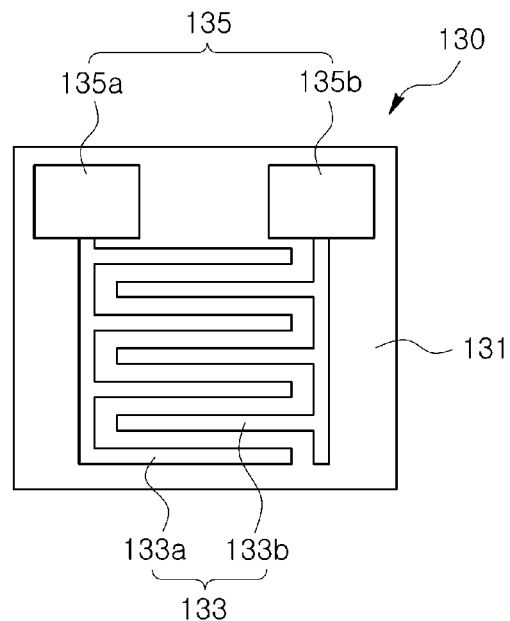
FIG. 5A is a diagram illustrating a pattern of conductors in the electroadhesive module of the shape compliant electroadhesive gripper according to one embodiment of the present disclosure.
Figure 5B:
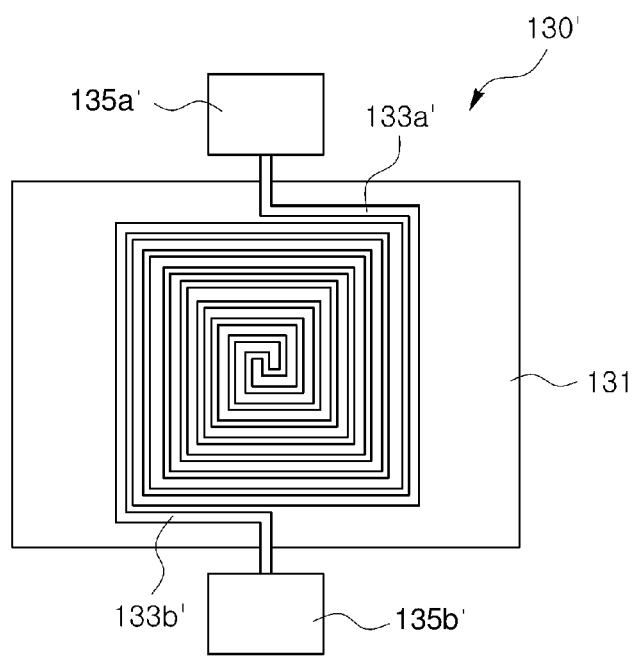
FIG. 5B is a diagram illustrating a pattern of conductors in the electroadhesive module of the shape compliant electroadhesive gripper according to one embodiment of the present disclosure.

FIG. 4 is a cross-sectional view of the electroadhesive module of the shape compliant electroadhesive gripper according to one embodiment of the present disclosure, and FIGS. 5A and 5B are diagrams illustrating various patterns of conductors in the electroadhesive module of the shape compliant electroadhesive gripper according to one embodiment of the present disclosure.

Referring to FIGS. 4, 5A and 5B, the electroadhesive module 130 according to one embodiment of the present disclosure may include a first conductor 133a, a second conductor 133b, and an insulator 131 for separating and electrically isolating the first conductor 133a and the second conductor 133b from each other. Further, the first conductor 133a and the second conductor 133b may be respectively connected to a first electrode 135a and a second electrode 135b. When different voltages are respectively applied to the first conductor 133a and the second conductor 133b in the electroadhesive module 130 having such a configuration, an electrostatic force is generated between the electroadhesive module 130 and an adjacent external object due to a difference between the applied voltages, and thus adhesion may be made between the electroadhesive module 130 and the adjacent external object.

The insulator 131 of the electroadhesive module 130 may be made of a flexible and deformable material such as silicone rubber, polyurethane, polydimethylsiloxane (PDMS), polyimide, or the like, and the conductor 133 may be made of a conductive material such as a metal, carbon, a conductive polymer, or the like. Accordingly, when the electroadhesive module 130 is in contact with the external object so as to pick up the external object with the shape compliant electroadhesive gripper 100, a surface of the insulator 131 is brought into close contact with the external object surface to increase a contact area, and thus an adhesive strength may be maximized.

Although it has been exemplified that the conductor 133 was disposed on the insulator 131 to expose a surface of the conductor 133, the present disclosure is not limited thereto, and the conductor 133 may be embedded in the insulator 131. Further, the materials of the conductor and the insulator are not limited to the above-described materials, and other known materials may be used.

According to one embodiment of the present disclosure, the conductor may be disposed in various patterns. Referring to FIG. 5A, the first conductor 133a and the second conductor 133b may be disposed in the form of being spaced apart to be alternately interlocked with each other and may be respectively connected to the first electrode 135a and the second electrode 135b. Alternatively, as shown in FIG. 5B, a first conductor 133a' and a second conductor 133b' may be disposed in the form of being spaced apart and spirally staggered and may be respectively connected to a first electrode 135a' and a second electrode 135b'. In addition to the foregoing, a first conductor and a second conductor may be disposed and spaced apart from each other in various patterns.

Meanwhile, in the embodiment of the present disclosure, it has been exemplified that the first conductor and the second conductor were disposed apart from each other on the insulator, but alternatively, the insulator may be disposed on the first conductor and the second conductor may be disposed on the insulator, so that the first conductor and the second conductor are spaced apart from each other. Further, in the embodiment of the present disclosure, it has been exemplified that the electroadhesive module include two conductors spaced apart from each other by the insulator and capable of being applied different voltages, but alternatively, the electroadhesive module may include only a single conductor disposed on the insulator.

As described above, the shape compliant electroadhesive gripper 100 according to one embodiment of the present disclosure may include the shape compliant module 120 and the electroadhesive module 130 to pick up objects of various sizes, shapes, and materials.

FIGS. 6A through 6D are diagrams illustrating a case in which an object is picked up using the shape compliant electroadhesive gripper according to one embodiment of the present disclosure, and hereinafter, an operation of a gripper according to the present disclosure with reference to the illustrated case.

Figure 6A:
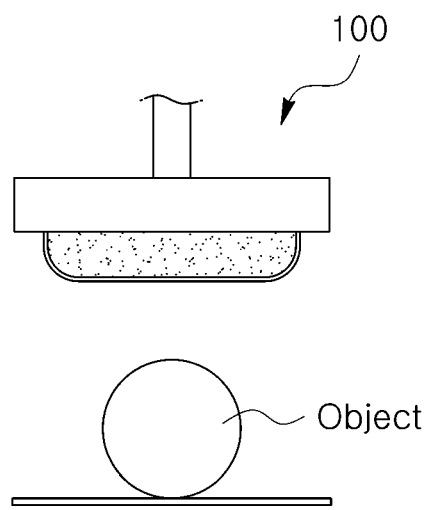
FIG. 6A is a diagram illustrating a case in which an object is picked up using the shape compliant electroadhesive gripper according to one embodiment of the present disclosure.

First, the shape compliant electroadhesive gripper 100 is moved adjacent to an object (see FIG. 6A). The movement of the shape compliant electroadhesive gripper 100 may be made by controlling two connectors and a robot arm connected to the shape compliant electroadhesive gripper 100, and the shape compliant electroadhesive gripper 100 may approach the object through a translational movement of the robot arm and rotational movements of the connectors according to a position of the object.

Figure 6B:
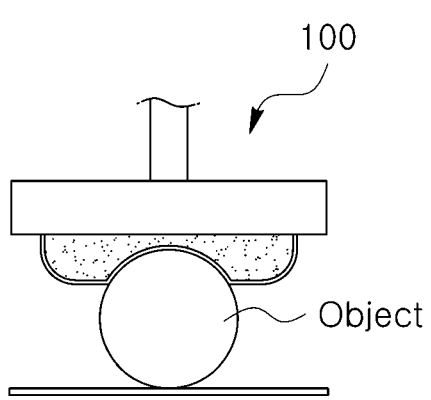
FIG. 6B is a diagram illustrating a case in which an object is picked up using the shape compliant electroadhesive gripper according to one embodiment of the present disclosure.

Next, the shape compliant electroadhesive gripper 100 is brought into contact with a surface of the object (see FIG. 6B). At this point, the shape compliant module of the shape compliant electroadhesive gripper 100 is deformable due to low rigidity of the shape compliant module, and as the shape compliant electroadhesive gripper 100 comes into contact with the object, the shape compliant module is deformed according to a surface shape of the object. As described above, the electroadhesive module of the shape compliant electroadhesive gripper 100 is made of a deformable and flexible material, and thus a shape of the electroadhesive module is also deformed according to the surface shape of the object.

Figure 6C:
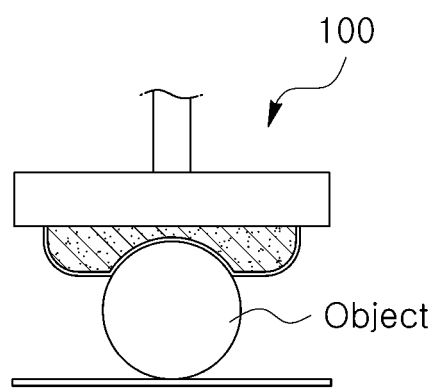
FIG. 6C is a diagram illustrating a case in which an object is picked up using the shape compliant electroadhesive gripper according to one embodiment of the present disclosure.

After the shape compliant electroadhesive gripper 100 and the surface of the object are in contact with each other, rigidity of the shape compliant module of the shape compliant electroadhesive gripper 100 is increased, and the object is adhered to the electroadhesive module by applying a voltage to the electroadhesive module of the shape compliant electroadhesive gripper 100 (see FIG. 6C). In order to increase the rigidity of the shape compliant module, for example, a magnetic field is applied when the shape compliant module includes a magnetorheological elastomer, whereas an electric field is applied when the shape compliant module includes an electrorheological elastomer. Accordingly, when the object is attached to the shape compliant electroadhesive gripper 100, the object may be transferred to a desired position through driving of the robot arm and the connector.

Figure 6D:
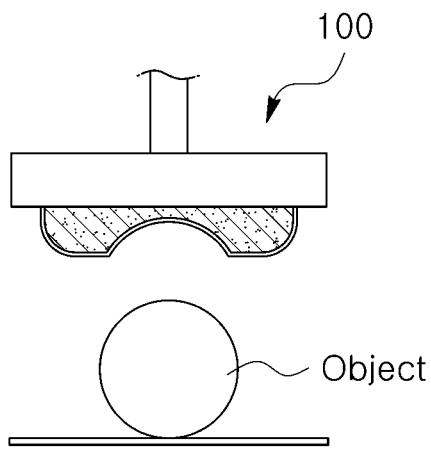
FIG. 6D is a diagram illustrating a case in which an object is picked up using the shape compliant electroadhesive gripper according to one embodiment of the present disclosure.

After the object is transferred to the desired position, the voltage applied to the electroadhesive module of the shape compliant electroadhesive gripper 100 is released to remove adhesive force (see FIG. 6D). In the drawing, it has been exemplified that the electroadhesive force is removed while the rigidity of the shape compliant module is maintained, but alternatively, it is possible to remove the electroadhesive force after the rigidity of the shape compliant module is returned to its original state (i.e., after the rigidity is reduced), and further the return of the rigidity and the removal of the electroadhesive force may be simultaneously performed. Even when the voltage applied to the electroadhesive module is released, a certain period of time may be required until the electroadhesive force is completely removed, and as the rigidity of the shape compliant module is restored to its original state, a restoring force of the shape compliant module may be generated thereby increasing a removal speed of the object.

As such, the shape compliant electroadhesive gripper 100 according to one embodiment of the present disclosure may include the shape compliant module and the electroadhesive module and control the rigidity of the shape compliant module and the voltage application to the electroadhesive module, thereby picking up objects of various sizes and shapes. Particularly, when the shape compliant electroadhesive gripper 100 and an object are in contact with each other, a contact area between the shape compliant electroadhesive gripper 100 and the object can be increased by the shape compliant module of which rigidity is variably controllable thereby enhancing the electroadhesive force as well as the shape compliant module can be maintained in the deformed shape, such that a shape of the electroadhesive module can be maintained without being deformed by gravity or an external force to firmly warp and support the object. That is, according to one embodiment of the present disclosure, the object can be effectively picked up through a gripping force by the shape compliant module in addition to the electroadhesive force by the electroadhesive module. Further, when the adhered object is detached, a removable speed can be increased by the restoring force of the shape compliant module.

In the above-described embodiment, the shape compliant electroadhesive gripper is configured with a plate-shaped gripper, but the shape compliant electroadhesive gripper may be configured with a multi-finger type gripper having a plurality of fingers.

Figure 7:
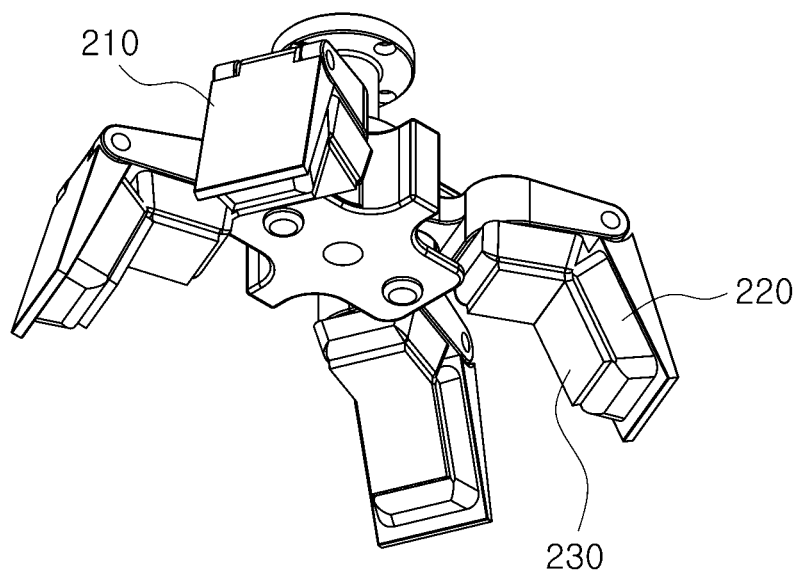
FIG. 7 is a perspective view of a shape compliant electroadhesive gripper according to another embodiment of the present disclosure.

FIG. 7 is a perspective view of a shape compliant electroadhesive gripper according to another embodiment of the present disclosure, and referring to FIG. 7, a shape compliant electroadhesive gripper 200 according to another embodiment of the present disclosure includes a plurality of fingers 210, a shape compliant module 220 disposed on each of the plurality of fingers 210, and an electroadhesive module 230 disposed on each of the shape compliant modules 220.

The plurality of fingers 210 of the shape compliant electroadhesive gripper 200 according to the present embodiment may be connected to a shaft, which is connected to a robot arm, so that a movement of each of the plurality of fingers 210 may be controlled. As described below, a finger driver (not shown) may be additionally provided to rotate the plurality of fingers 210 about a common shaft.

As in the above-described embodiment, the shape compliant module 220 disposed on each of the plurality of fingers 210 is configured such that rigidity of the shape compliant module 220 may be variably controllable. For example, the shape compliant module 220 may include a magnetorheological elastomer and a magnetic field controller 112 or may include an electrorheological elastomer and an electric field controller.

The electroadhesive module 230 is disposed on each of the shape compliant modules 220. As in the above-described embodiment, the electroadhesive module 230 may include an insulator and a conductor installed on the insulator, and thus the electroadhesive module 230 may adhere an object to the shape compliant electroadhesive gripper 200 using an electrostatic force generated when a voltage is applied to the conductor.

That is, in order to pick up an object using the shape compliant electroadhesive gripper 200 according to the present embodiment, the plurality of fingers 210 are driven according to a shape and a size of the object and are disposed at appropriate positions, the shape compliant module 220 is deformed according to a surface of the object through control of rigidity of the shape compliant module 220, and the electroadhesive module 230 is driven to adhere the object to the shape compliant electroadhesive gripper 200 through an electroadhesion manner.

Figure 8A:
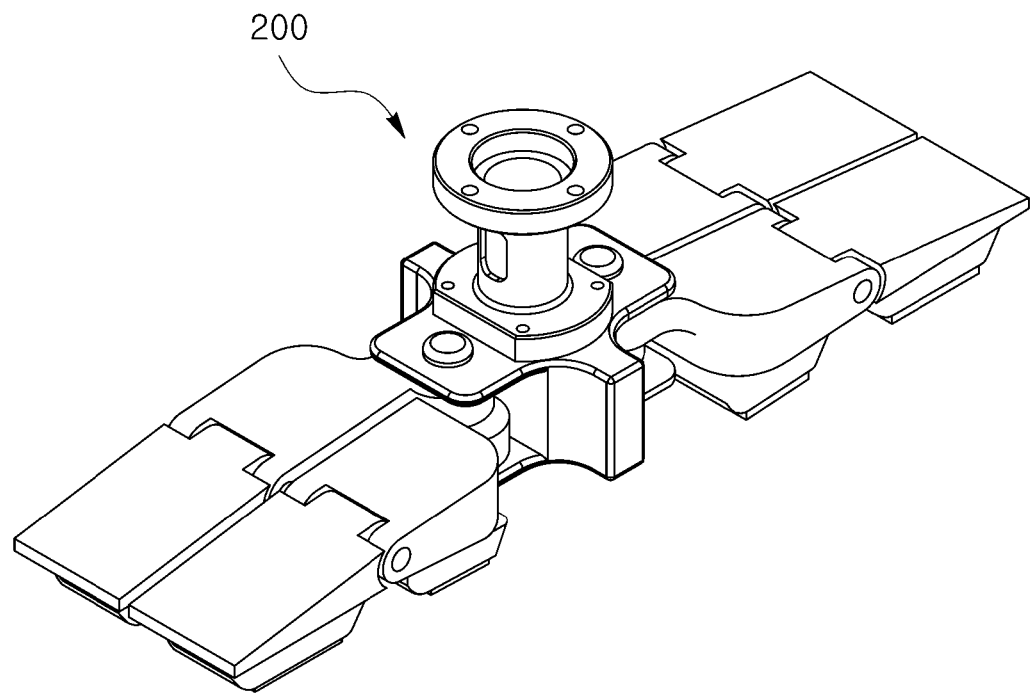
FIG. 8A is a diagram illustrating an operation of the shape compliant electroadhesive gripper according to another embodiment of the present disclosure.
Figure 8B:
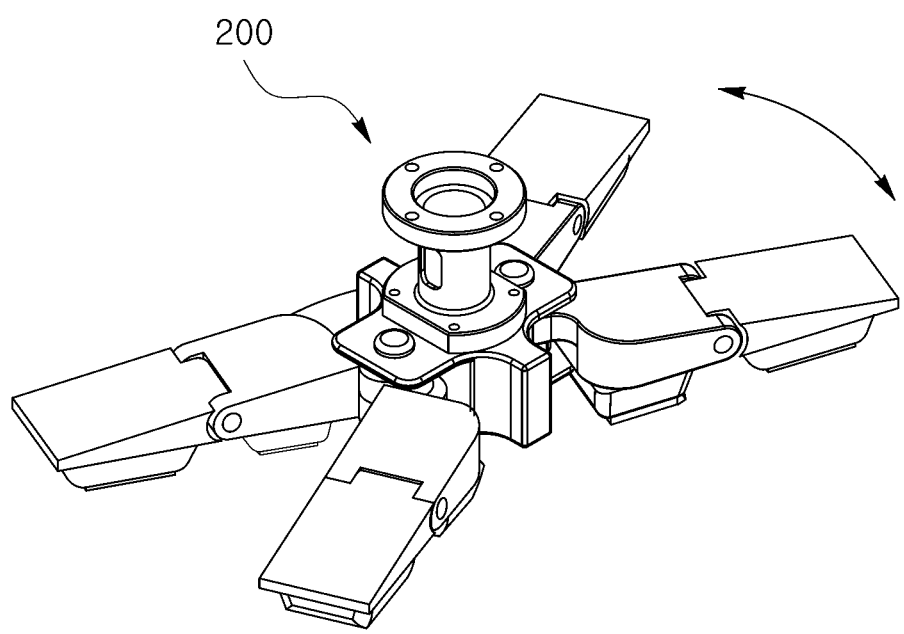
FIG. 8B is a diagram illustrating an operation of the shape compliant electroadhesive gripper according to another embodiment of the present disclosure.
Figure 8C:
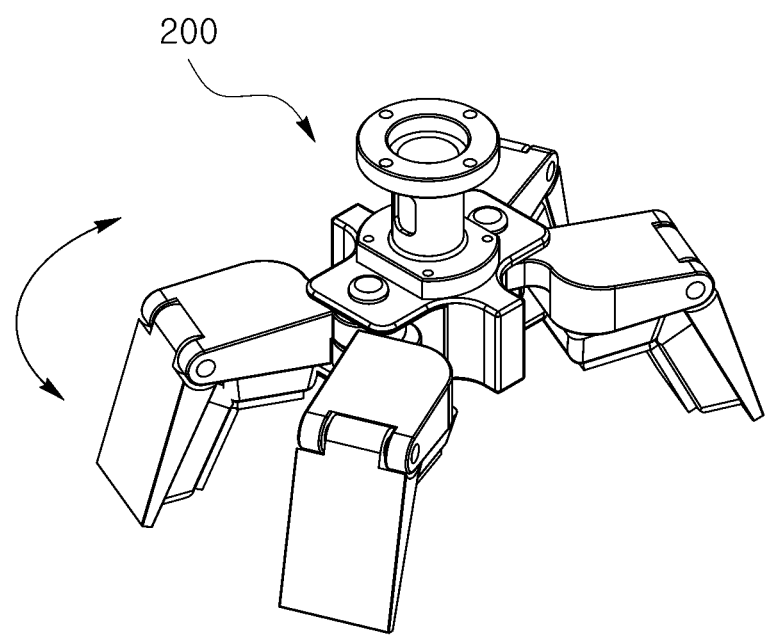
FIG. 8C is a diagram illustrating an operation of the shape compliant electroadhesive gripper according to another embodiment of the present disclosure.
Figure 9A:
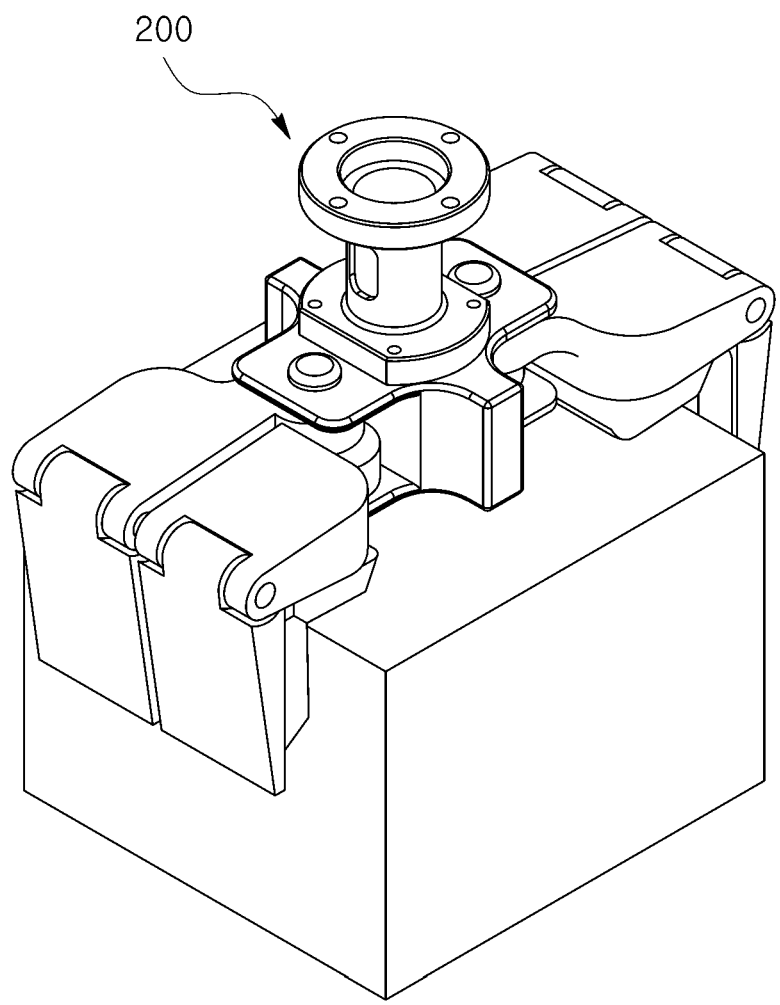
FIG. 9A is a diagram illustrating a case in which objects of various shapes are picked up using the shape compliant electroadhesive gripper according to another embodiment of the present disclosure.
Figure 9B:
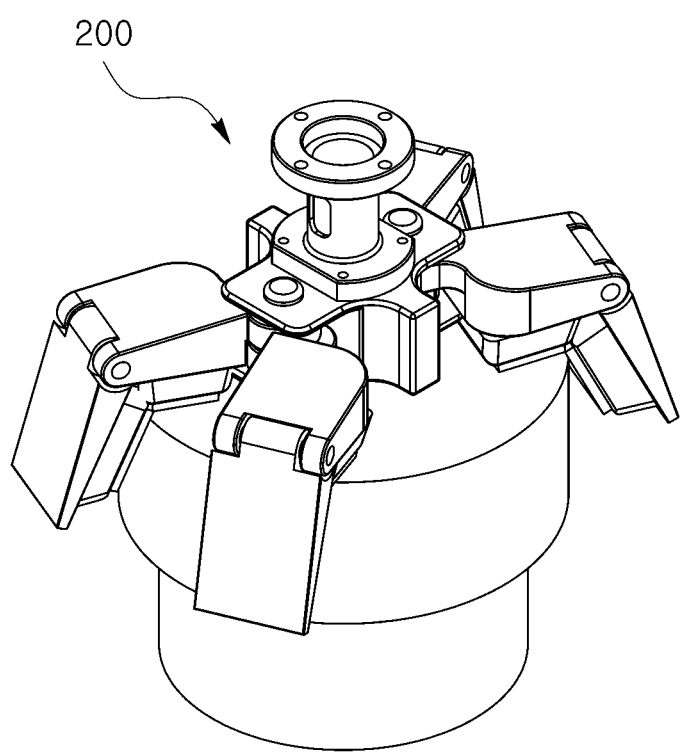
FIG. 9B is a diagram illustrating a case in which objects of various shapes are picked up using the shape compliant electroadhesive gripper according to another embodiment of the present disclosure.
Figure 9C:
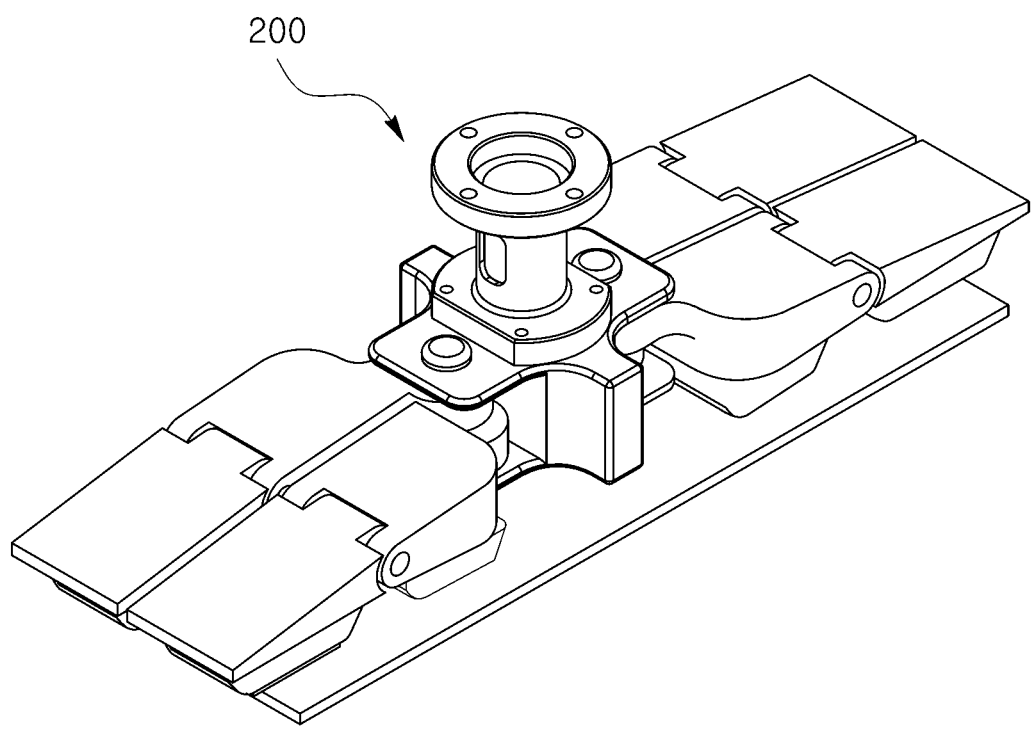
FIG. 9C is a diagram illustrating a case in which objects of various shapes are picked up using the shape compliant electroadhesive gripper according to another embodiment of the present disclosure.

FIGS. 8A to 8C are diagrams illustrating an operation of the shape compliant electroadhesive gripper according to another embodiment of the present disclosure, and FIGS. 9A to 9C are diagrams illustrating a case in which objects of various shapes are picked up using the shape compliant electroadhesive gripper according to another embodiment of the present disclosure. Operations of the shape compliant module 220 and the electroadhesive module 230 according to the present embodiment are the same as those described in the above-described embodiment, and thus descriptions thereof will be omitted, and driving of the plurality of fingers 210 of the shape compliant electroadhesive gripper 200 according to the present embodiment will be described below.

Referring to FIG. 8A, four fingers of the shape compliant electroadhesive gripper 200 may be disposed in two pairs facing each other in a state in which a joint of each of the four fingers is unfolded. In this embodiment, the shape compliant electroadhesive gripper 200 is exemplified as having the four fingers 210, but the number of fingers may be variously changed.

Referring to FIGS. 8B and 8C, the plurality of fingers may be rotationally driven about the shaft connected to the robot arm (see FIG. 8B), and the joint provided included at each of the plurality of fingers may be driven to be folded in a direction in which the shape compliant module and the electroadhesive module are disposed (see FIG. 8C).

In the present embodiment, the driving in rotation and bending of the plurality of fingers is controlled, and thus the plurality of fingers may pick up objects having various shapes and sizes such as a rectangular parallelepiped object (see FIG. 9A), a cylindrical object (see FIG. 9B), and a plate-shaped object (see FIG. 9C). In other words, according to the present embodiment, since the plurality of fingers of the shape compliant electroadhesive gripper 200 may be driven with two degrees of freedom such as the rotation and the bending, and thus shapes of the plurality of fingers may be deformed to correspond to object having various shapes and sizes.

As such, the shape compliant electroadhesive gripper 200 according to the present embodiment may effectively pick up the objects through the gripping force by the plurality of fingers in addition to the electroadhesive force by the electroadhesive module and the gripping force by the shape compliant module.

Although the driving of the plurality of fingers are individually controlled in the present embodiment, but it is preferable that the shape compliant module and the electroadhesive module, which are disposed at each of the plurality of fingers, are collectively controlled. That is, it is preferable that the rigidities of the shape compliant modules disposed on the plurality of fingers are collectively controlled in order to deform the shape compliant modules disposed on the plurality of fingers according to a surface shape of an object, and the voltage applications to the electroadhesive module are collectively controlled to generate the electroadhesive force between the electroadhesive module and the object.

While the present disclosure has been described with reference to specific items such as particular components and exemplary embodiments, these embodiment are merely provided to help understanding the present disclosure, and the present disclosure is not limited to these embodiments, and those skilled in the art to which the present disclosure pertains can variously alter and modify from the exemplary embodiments of the present disclosure. Therefore, the spirit of the present disclosure should not be limited to the above-described embodiments, and it should be construed that the appended claims as well as all equivalents or equivalent modifications of the appended claims will fall within the scope of the present disclosure.

What is claimed is:

1. A shape compliant electroadhesive gripper for picking up an atypical object, the gripper comprising:
   a single body having a seamless flat side;
   a single shape compliant module disposed on the seamless flat side of the body, rigidity of the shape compliant module being variably controllable; and
   an electroadhesive module disposed on the shape compliant module,
   wherein the shape compliant module includes a magnetorheological elastomer and a magnetic field controller, and
   when a magnetic field is not applied, a shape of the shape compliant module is changed according to a shape of an external object which is brought into contact with the shape compliant electroadhesive gripper, and when the magnetic field is applied by the magnetic field controller, rigidity of the magnetorheological elastomer is increased to maintain the shape of the shape compliant module and wrap and support the external object, and
   the shape compliant module continuously covers the seamless flat side of the body and the electroadhesive module continuously covers a surface of the shape compliant module such that an entire of the shape compliant module is surrounded by the body and the electroadhesive module.

2. The gripper of claim 1, wherein:
   the electroadhesive module includes an insulator and a conductor disposed on the insulator, and
   the shape compliant electroadhesive gripper is able to adhere to an external object by an electrostatic force generated when a voltage is applied to the conductor.

3. The gripper of claim 2, wherein:
   the conductor includes a first conductor and a second conductor,
   the first conductor and the second conductor are disposed and spaced apart from each other on the insulator, and
   the shape compliant electroadhesive gripper is able to adhere to the external object by an electrostatic force generated when first and second voltages which are different from each other are applied to the first and the second conductors, respectively.

4. The gripper of claim 1, wherein the body is connected to a gripper driver and is rotatable in two directions.

* * * * *